US007648268B2

(12) United States Patent
Yerlikaya

(10) Patent No.: US 7,648,268 B2
(45) Date of Patent: Jan. 19, 2010

(54) METHOD OF MAKING ELECTRONIC THERMOMETER WITH ANTI-THEFT FEATURE

(75) Inventor: Denis Y. Yerlikaya, De Peres, MO (US)

(73) Assignee: Covidien AG (CH)

( * ) Notice: Subject to any disclaimer, the term of this patent is extended or adjusted under 35 U.S.C. 154(b) by 0 days.

(21) Appl. No.: 12/433,278

(22) Filed: Apr. 30, 2009

(65) Prior Publication Data

US 2009/0205195 A1 Aug. 20, 2009

Related U.S. Application Data

(62) Division of application No. 11/539,548, filed on Oct. 6, 2006.

(51) Int. Cl.
*G01K 1/00* (2006.01)
*G01K 7/00* (2006.01)

(52) U.S. Cl. .................... 374/100; 374/208; 374/163; 374/183; 29/602.1

(58) Field of Classification Search ................ 374/100, 374/4, 163, 141, 208, 183, 120, 170; 250/338.1; 340/870.17, 426.1, 568.1, 571, 565, 522, 340/541, 567; 600/474, 549; 726/2, 26, 726/35; 29/592.1, 593, 595, 602.1
See application file for complete search history.

(56) References Cited

U.S. PATENT DOCUMENTS

| 2,201,039 | A | * | 5/1940 | Hammond | 337/1 |
|---|---|---|---|---|---|
| 3,550,448 | A | | 12/1970 | Ensign | |
| 3,729,998 | A | | 5/1973 | Mueller et al. | |
| 3,785,207 | A | | 1/1974 | Brzezinski | |
| 3,893,058 | A | | 7/1975 | Keith | |
| 3,905,232 | A | | 9/1975 | Knute | |
| 3,965,743 | A | | 6/1976 | Turner | |
| 4,112,764 | A | | 9/1978 | Turner | |
| 4,121,574 | A | | 10/1978 | Lester | |

(Continued)

FOREIGN PATENT DOCUMENTS

GB 2148010 A 5/1985

(Continued)

OTHER PUBLICATIONS

Extended European Search Report issued in Application No. 07117982.4, dated Apr. 29, 2008, 7 pages.

(Continued)

*Primary Examiner*—Gail Verbitsky
(74) *Attorney, Agent, or Firm*—Edward S. Jarmolowicz, Esq.

(57) ABSTRACT

A method of making an electronic thermometry assembly includes assembling a magnetic source capable of generating a magnetic field into a housing of the mount. A microcontroller including a resettable anti-theft counter for recording a use-parameter of the thermometer is mounted on a circuit board so that the thermometer is disabled in an anti-theft mode when the counter reaches a pre-selected number. A solid-state sensor in communication with the microcontroller is mounted on the circuit board. The sensor is capable of being activated by the magnetic field of the magnetic source to signal to the microcontroller to reset the anti-theft counter. The circuit board is assembled with the microcontroller and solid-state sensor thereon into a housing of the thermometer.

14 Claims, 17 Drawing Sheets

U.S. PATENT DOCUMENTS

| | | |
|---|---|---|
| 4,260,058 A | 4/1981 | Paull et al. |
| 4,444,517 A | 4/1984 | Murase |
| 4,497,585 A | 2/1985 | Paull et al. |
| 4,536,851 A | 8/1985 | Germanton et al. |
| 4,537,516 A | 8/1985 | Epstein |
| 4,546,266 A | 10/1985 | Zenick et al. |
| 4,549,819 A | 10/1985 | Muramoto et al. |
| 4,602,642 A | 7/1986 | O'Hara et al. |
| 4,608,532 A | 8/1986 | Ibar et al. |
| 4,619,271 A | 10/1986 | Burger et al. |
| 4,718,775 A | 1/1988 | Keznicki |
| 4,728,199 A | 3/1988 | Murai et al. |
| 4,762,429 A | 8/1988 | Fujikawa |
| 4,800,361 A | 1/1989 | Greif |
| 4,862,310 A | 8/1989 | Harrington, III |
| 4,959,860 A | 9/1990 | Watters et al. |
| 5,021,779 A | 6/1991 | Bisak |
| 5,057,824 A | 10/1991 | Stokes |
| 5,133,606 A | 7/1992 | Zaragoza et al. |
| 5,411,032 A | 5/1995 | Esseff et al. |
| 5,487,607 A | 1/1996 | Makita et al. |
| 5,564,803 A | 10/1996 | McDonald et al. |
| 5,606,604 A | 2/1997 | Rosenblatt et al. |
| 5,612,682 A | 3/1997 | DeLuca et al. |
| 5,781,005 A | 7/1998 | Vig et al. |
| 6,005,489 A | 12/1999 | Siegle et al. |
| 6,097,272 A | 8/2000 | Grover et al. |
| 6,186,959 B1 | 2/2001 | Canfield et al. |
| 6,292,692 B1 | 9/2001 | Skelton et al. |
| 6,393,431 B1 | 5/2002 | Salvati et al. |
| 6,442,880 B1 | 9/2002 | Allan |
| 6,478,748 B1 | 11/2002 | Kuhn et al. |
| 6,607,041 B2 | 8/2003 | Suzuki et al. |
| 6,615,356 B1 | 9/2003 | Byun |
| 6,634,789 B2 | 10/2003 | Babkes |
| 6,727,814 B2 | 4/2004 | Saltzstein et al. |
| 6,750,747 B2 | 6/2004 | Mandell et al. |
| 6,827,488 B2 | 12/2004 | Knieriem et al. |
| 6,939,038 B2 | 9/2005 | Hsieh |
| 7,021,824 B2 | 4/2006 | Wawro et al. |
| 7,103,698 B2 | 9/2006 | Zhang et al. |
| 7,126,476 B2 | 10/2006 | Alkelai et al. |
| 7,199,688 B2 | 4/2007 | Edmonson, Jr. |
| 7,355,506 B2 | 4/2008 | Chandley |
| 7,362,248 B2 | 4/2008 | McClure et al. |
| 7,443,176 B2 | 10/2008 | McClure et al. |
| 7,548,160 B2 | 6/2009 | Huang et al. |
| 2002/0066034 A1 | 5/2002 | Schlossberg et al. |
| 2003/0002562 A1 | 1/2003 | Yerlikaya et al. |
| 2003/0130567 A1 | 7/2003 | Mault et al. |
| 2003/0225596 A1 | 12/2003 | Richardson et al. |
| 2004/0019258 A1 | 1/2004 | Kavounas et al. |
| 2004/0049233 A1 | 3/2004 | Edwards |
| 2004/0171935 A1 | 9/2004 | Van Creveld et al. |
| 2004/0186357 A1 | 9/2004 | Soderberg et al. |
| 2006/0022822 A1 | 2/2006 | Wong et al. |
| 2006/0036781 A1 | 2/2006 | Thacker |
| 2006/0123466 A1 | 6/2006 | Davis et al. |
| 2007/0075856 A1 | 4/2007 | Wu |
| 2007/0076778 A1 * | 4/2007 | Frick et al. .................. 374/100 |
| 2007/0100253 A1 | 5/2007 | Sisk et al. |
| 2007/0103278 A1 | 5/2007 | Kawata |
| 2008/0001740 A1 | 1/2008 | Liu et al. |
| 2008/0036590 A1 | 2/2008 | Gonzales et al. |
| 2008/0076459 A1 | 3/2008 | Shaju |
| 2008/0122649 A1 | 5/2008 | Liu et al. |
| 2008/0157958 A1 | 7/2008 | Lin et al. |

FOREIGN PATENT DOCUMENTS

| | | |
|---|---|---|
| JP | 2232535 | 9/1990 |
| WO | 2004036521 A2 | 4/2004 |

OTHER PUBLICATIONS

Alaris Medical Systems, Medication Safety at the Point of Care, Electronic Thermometers, 3 pages, Alaris Medical Systems, online catalog.

Graham, Christine, A Low-Power Hall-Effect Switch, reprint of article from Jun. 1999 edition of "Sensors Magazine", 2 pages, Allegro MicroSystems, Inc., www.allegromicro.com.

Gilbert, Joe, Unipolar Hall-Effect Sensors, 3 pages, undated (admitted as prior art), Allegro MicroSystems, Inc., www.allegromicro.com. 3213.

3213 and 3214: Micropower, Ultrasensitive Hall-Effect Switches, Data Sheet, 2003, 11 pages, Allegro MicroSystems, Inc., Worcester, Massachusetts.

Office action dated Dec. 31, 2008 from related U.S. Appl. No. 11/539,548, 6 pgs.

Ex parte Quayle dated Mar. 30, 2009 from related U.S. Appl. No. 11/539,548, 6 pgs.

\* cited by examiner

METHOD OF MAKING ELECTRONIC THERMOMETER WITH ANTI-THEFT FEATURE

CROSS-REFERENCE TO RELATED APPLICATION

The present application is a divisional application of U.S. patent application Ser. No. 11/539,548, filed Oct. 6, 2006, the entirety of which is herein incorporated by reference.

FIELD OF THE INVENTION

The present invention generally relates to methods of making electronic thermometers and more particularly to methods of making an electronic thermometer with an anti-theft system.

BACKGROUND OF THE INVENTION

Electronic thermometers are widely used in the healthcare field for measuring a patient's body temperature. Typical electronic thermometers have a base unit that is held in the palm of a hand and a probe with an elongated shaft connected to the base. The base unit includes a probe well for holding the probe when the thermometer is not in use. Electronic temperature sensors such as thermistors or other temperature sensitive elements are contained within a tip of the probe. When the tip is placed, for example, in a patient's mouth, the tip is heated up by the patient's body and the thermistor measures the temperature of the tip. Electronic components in the base unit receive input from the sensor components to compute the patient's temperature. The temperature is then typically displayed on a visual output device such as a seven segment numerical display device. Typically, electronic thermometers are powered by batteries to make the thermometers portable. Since the thermometers are portable, wall mounts or other holders may be included with the thermometers to provide places to securely store the thermometers.

Some medical-grade electronic thermometers have an anti-theft mechanism for deterring theft. One type of anti-theft mechanism employs a microcontroller with a counter that records the number of uses of the thermometer. When the counter reaches a predetermined number, then the thermometer is disabled. The counter can be reset by placing the thermometer on the wall mount, for example. When the thermometer is placed back on the wall mount, an anti-theft switch in the thermometer is activated, resetting the counter. A conventional anti-theft switch may include a reed switch in communication with the microcontroller. In this type of anti-theft mechanism, the mount includes a magnet having sufficient strength to bring the contact reeds together within the tube of the switch (activating the switch), thereby resetting the counter. Like the true mechanical switch, the reed switch is prone to mechanical wear and failure. Moreover, the reed switch is fragile, as the contact reeds are maintained in a glass vacuum tube. Still further, the magnet used to open the switch typically must have a flux density of at least about 1200 Gauss, which means the magnet is probably bulky and expensive.

SUMMARY OF THE INVENTION

In one embodiment, a method of making an electronic thermometry assembly including a thermometer and a mount for receiving the thermometer comprises assembling a magnetic source capable of generating a magnetic field into a housing of the mount. A microcontroller including a resettable anti-theft counter for recording a use-parameter of the thermometer is mounted on a circuit board, wherein the thermometer is disabled in an anti-theft mode when the counter reaches a pre-selected number. A solid-state sensor in communication with the microcontroller is mounted on the circuit board. The sensor is capable of being activated by the magnetic field of the magnetic source to signal to the microcontroller to reset the anti-theft counter and enable the thermometer to take temperature data. The circuit board is assembled with the microcontroller and solid-state sensor thereon into a housing of the thermometer.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 1:
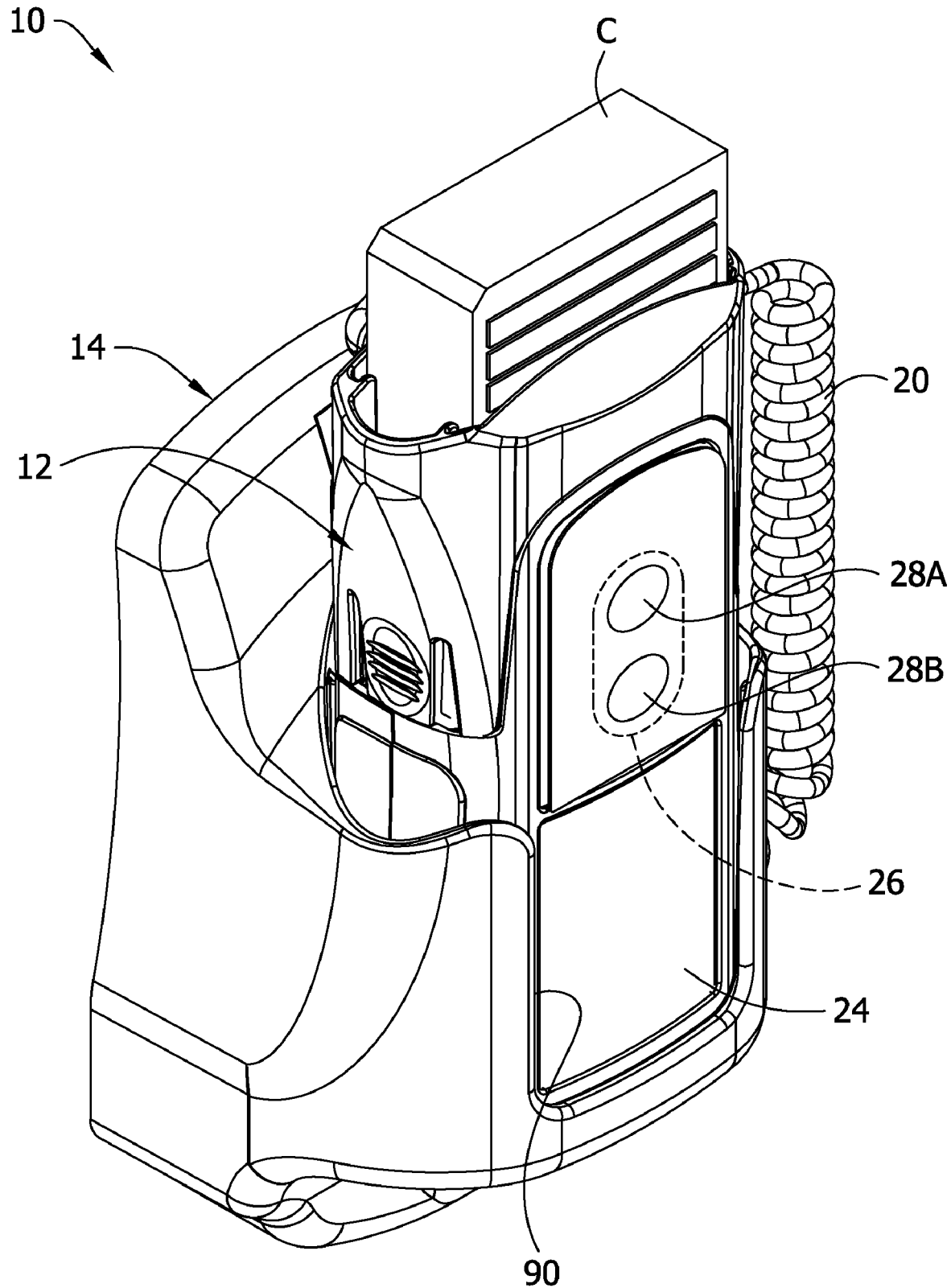
FIG. 1 is a perspective of one embodiment of a thermometry assembly including a thermometer received in a mount.
Figure 2:
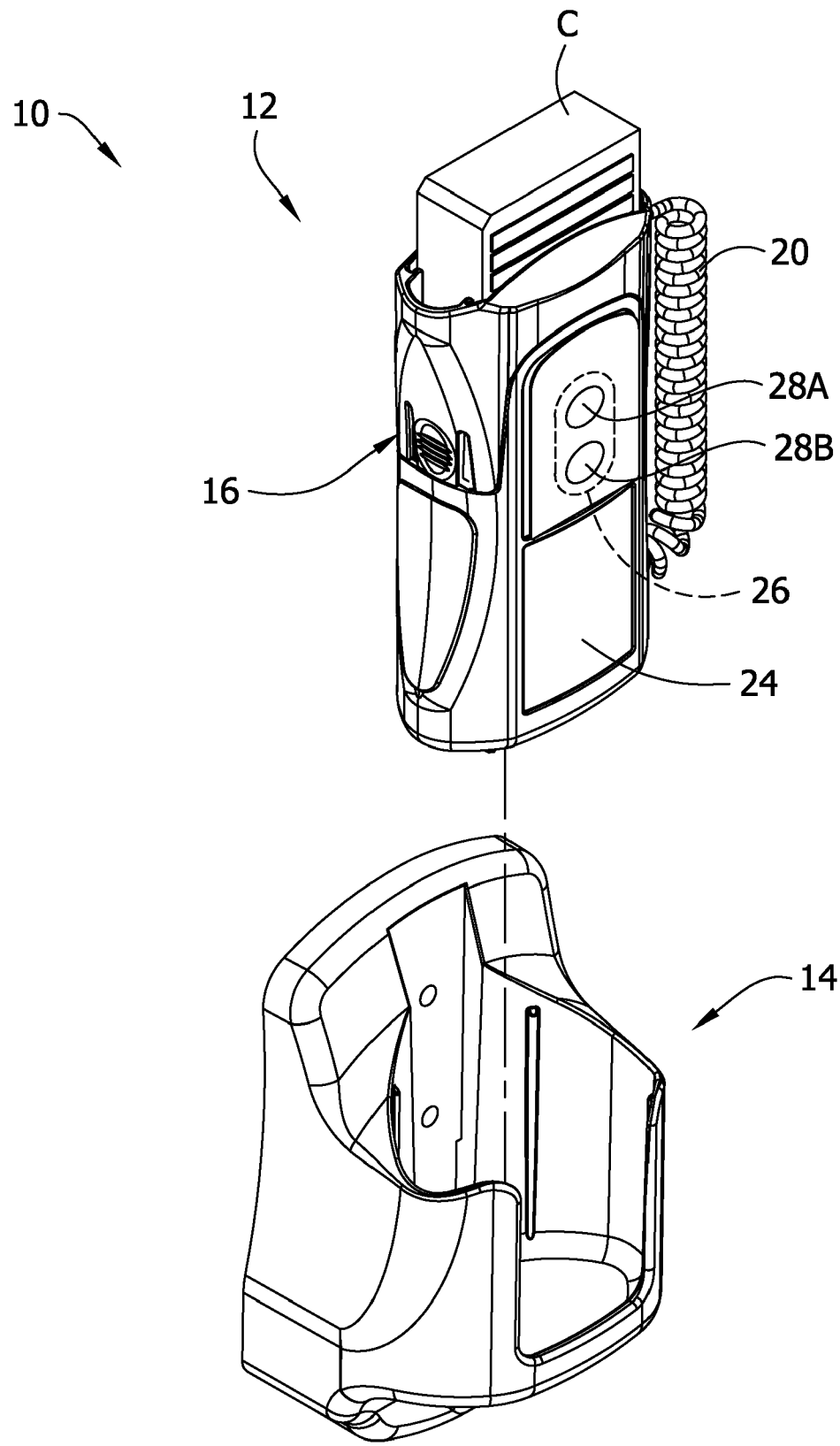
FIG. 2 is the thermometry assembly of FIG. 1 with the thermometer exploded from the mount.

Referring now to the drawings and in particular to FIGS. 1 and 2, a thermometry assembly constructed according to the principles of the present invention is generally indicated at 10. In general, the thermometry apparatus includes a hand-held, electronic thermometer 12 and a mount 14 for mounting the thermometer on a wall or other structure (the reference numerals indicating their subjects generally).

Figure 3:
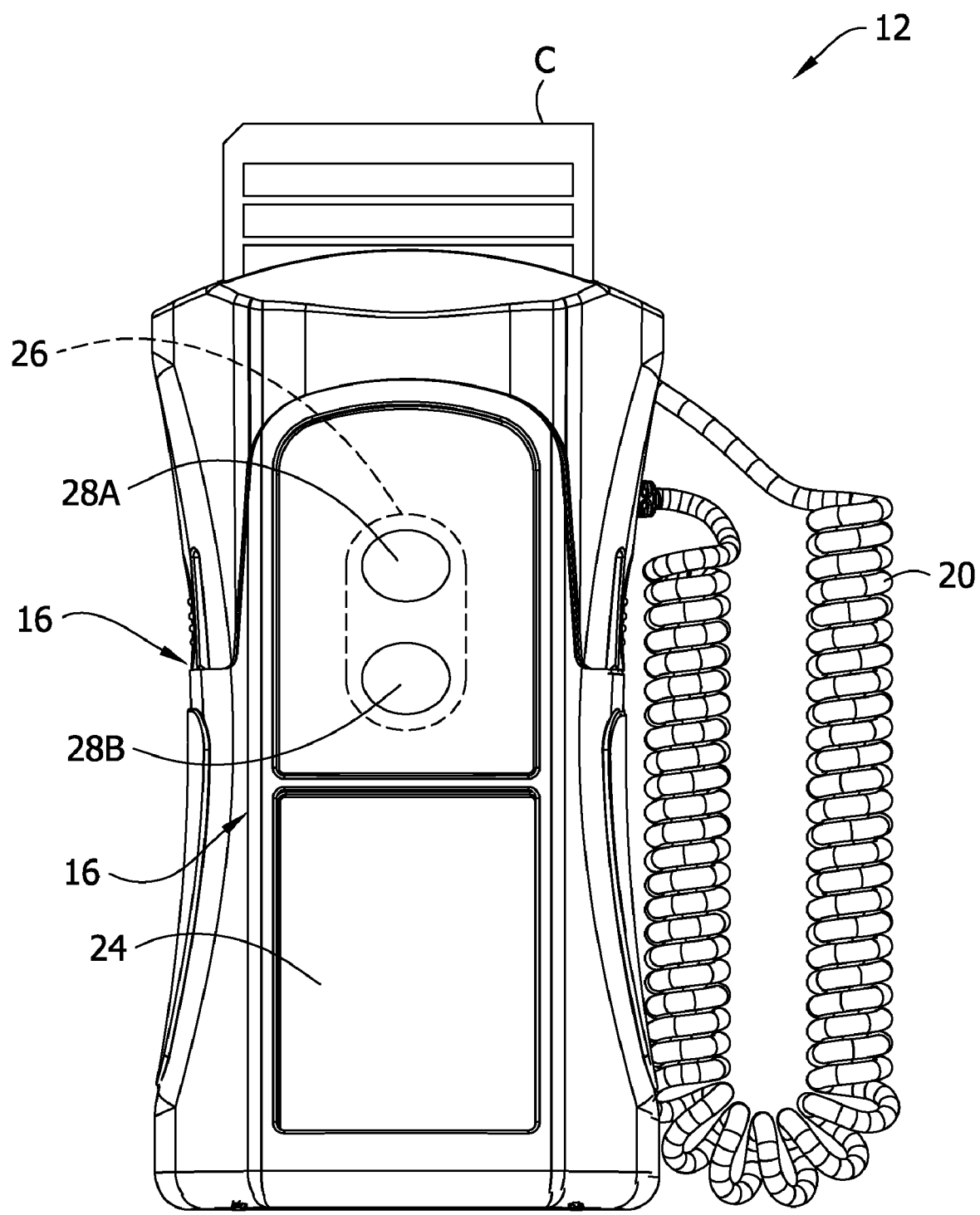
FIG. 3 is a front elevation of the thermometer.
Figure 4:
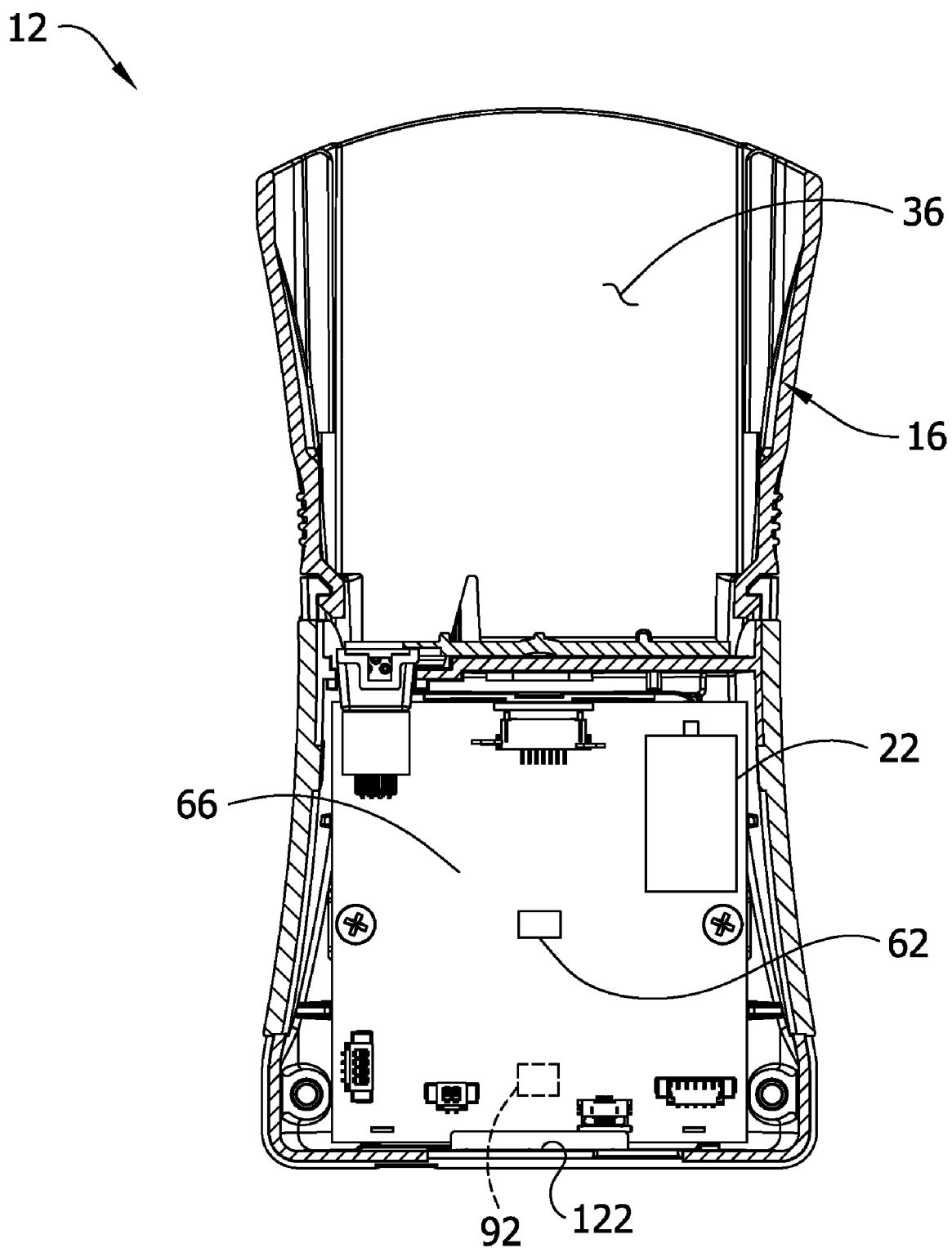
FIG. 4 is a section of the thermometer taken along its height.

Referring now also to FIGS. 3 and 4, the electronic thermometer 12 comprises a housing, indicated generally at 16, that is sized and shaped to be held comfortably in the hand. The housing is connected to a probe, generally indicated at 18 (FIG. 5), by a helical cord 20. The probe 18 is constructed for contacting the object (e.g., a patient) and sending signals representative of the temperature to a microcontroller 22 (FIG. 4) which is stored in the housing 16. The microcontroller 22 receives the signals from the probe 18 and uses them to calculate the temperature. The thermometer 12 may include other device and/or circuitry for performing these calculations, and these devices and/or circuitry along with the microcontroller 22 broadly constitute a calculating device of the thermometer. Logic in the microcontroller 22 may include a predictive algorithm for rapidly ascertaining the final temperature of the patient. The microcontroller 22 makes the calculated temperature appear on an LCD screen 24 (FIGS. 1-3) on a front side of the housing 16. Other information desirably can appear on the screen 24, as will be appreciated by those of ordinary skill in the art. A control panel 26 defined by a pair of buttons 28A, 28B for operating the thermometer 12 is located directly above the screen 24.

Figure 5:
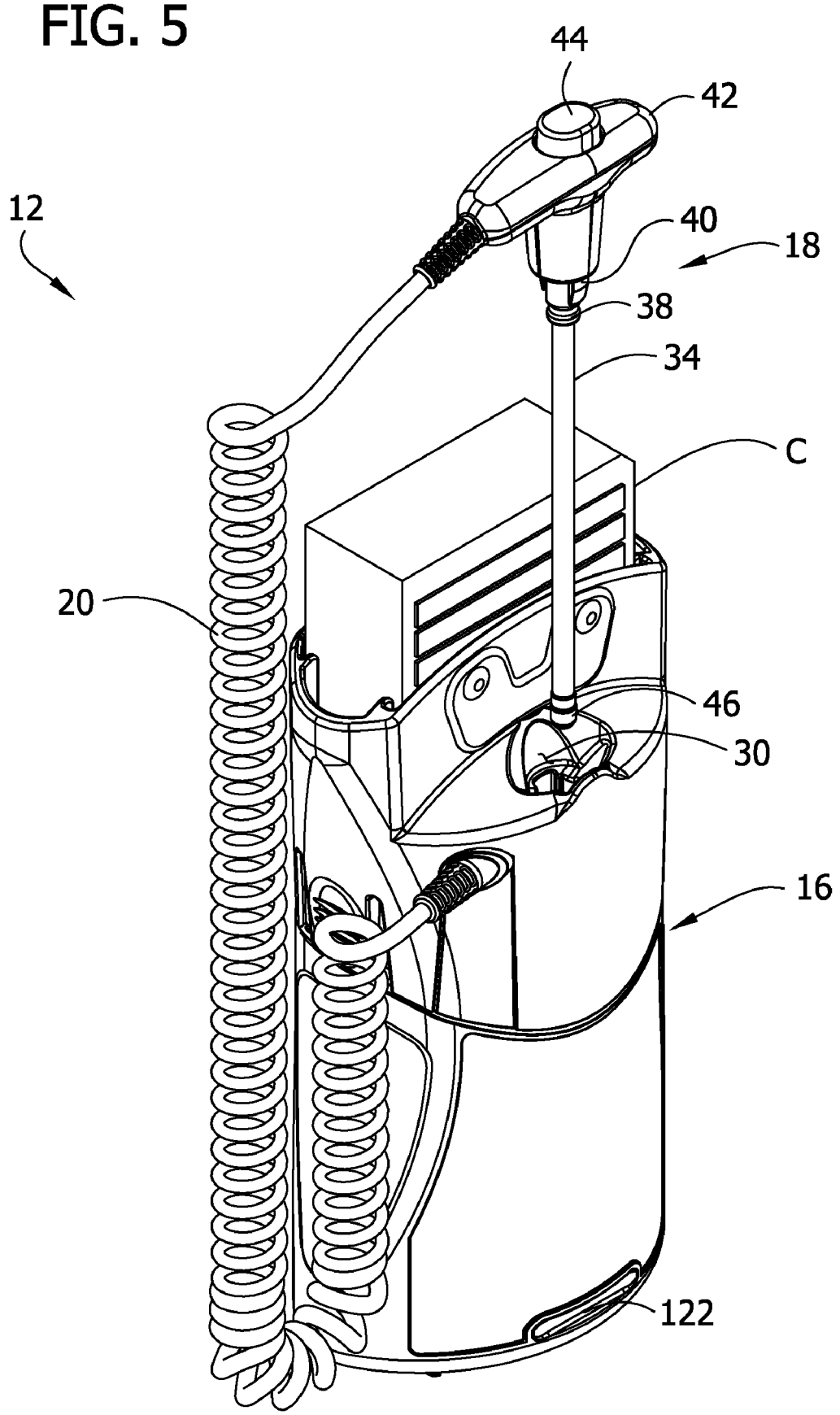
FIG. 5 is a rear perspective of the thermometer with a probe exploded from a probe well.
Figure 6:
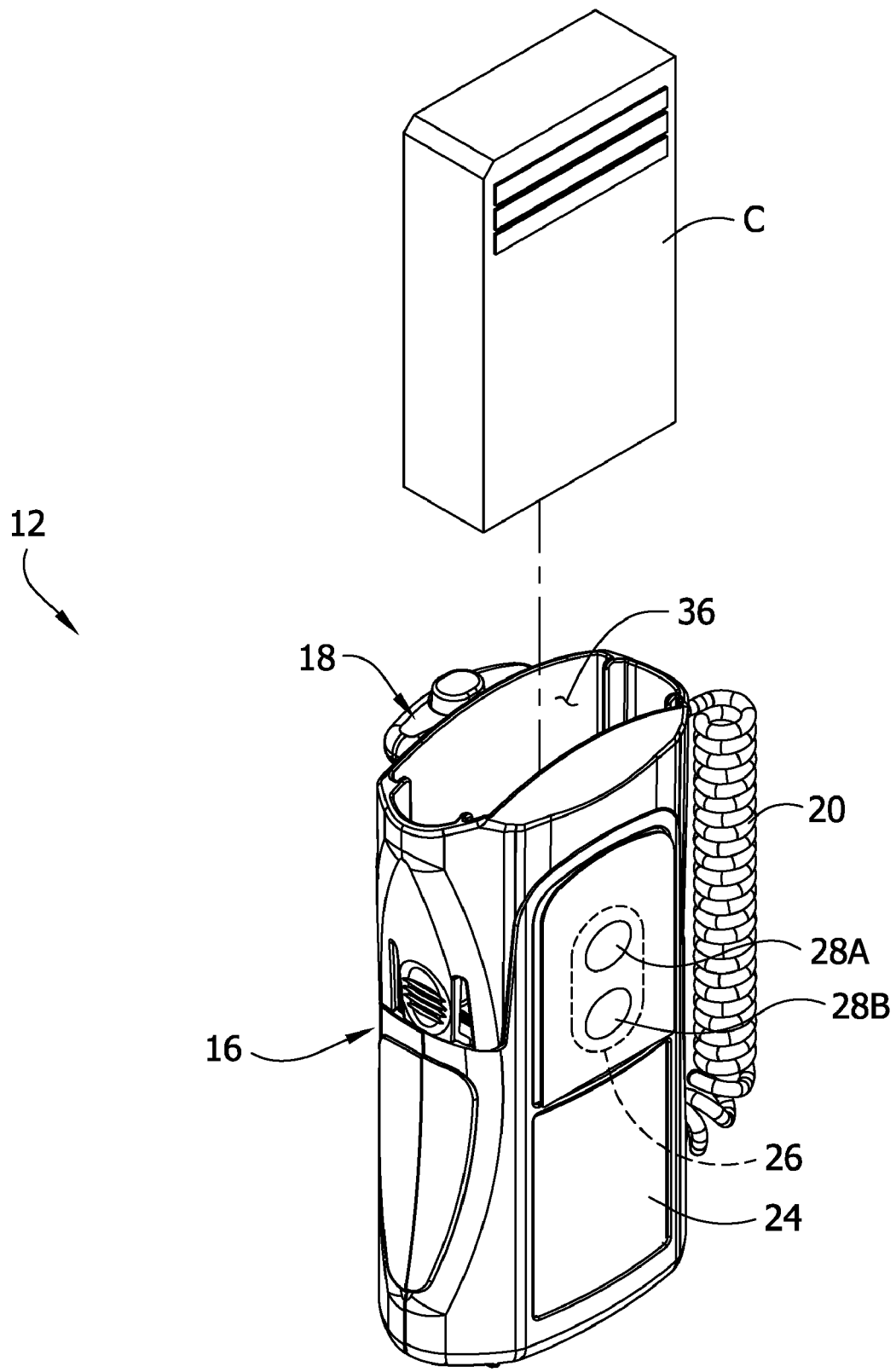
FIG. 6 is a front perspective of the thermometer with a carton of probe covers exploded from the thermometer.
Figure 7:
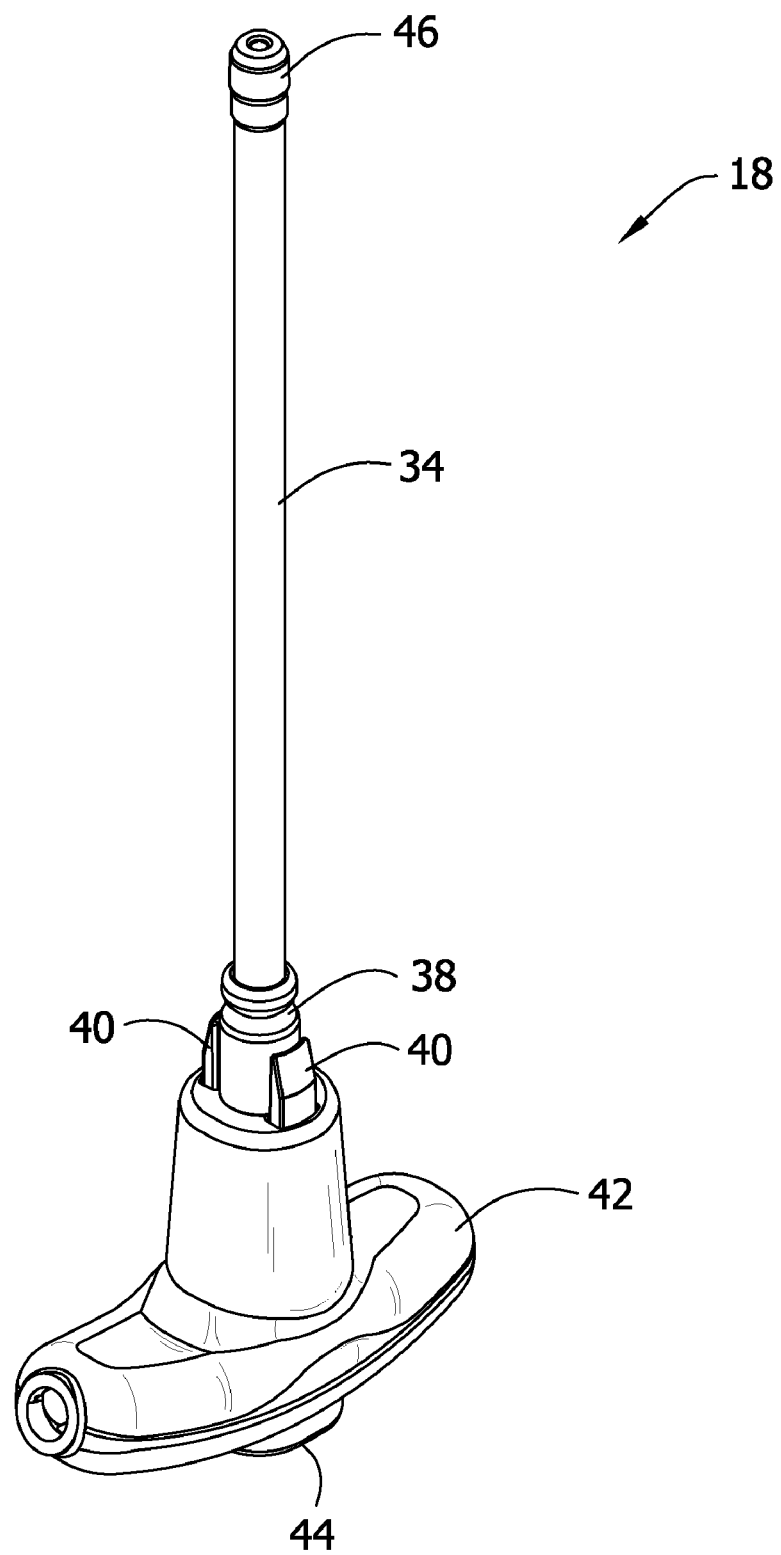
FIG. 7 is a perspective of the probe of the thermometer.

Referring to FIGS. 5-7, the housing 16 includes a probe well 30 generally at a back side of the housing 16 that can receive a shaft 34 (FIGS. 5 and 7) of the probe 18 into the housing for holding the probe and isolating the shaft from the environment when not in use. The housing 16 also has a receptacle 36 (FIG. 6) that receives a carton C of probe covers or another suitable container. In use, a top of the carton C is removed, exposing open ends of disposable probe covers (not shown). The shaft 34 of the probe 18 can be inserted into the open end of one of the probe covers and the probe cover can be captured (e.g., snapped into) an annular recess 38 (FIGS. 5 and 7) of the probe. The probe cover protects the probe shaft 34 from contamination when the shaft is inserted, for example, into a patient's mouth. Pushers 40 (FIGS. 5 and 7) located at the junction of a handle 42 of the probe 18 with a probe shaft 34 release the probe cover from the probe shaft when a button 44 on the probe handle 42 is depressed. Other ways of capturing and releasing probe covers may be used without departing from the scope of the present invention.

Figure 8:
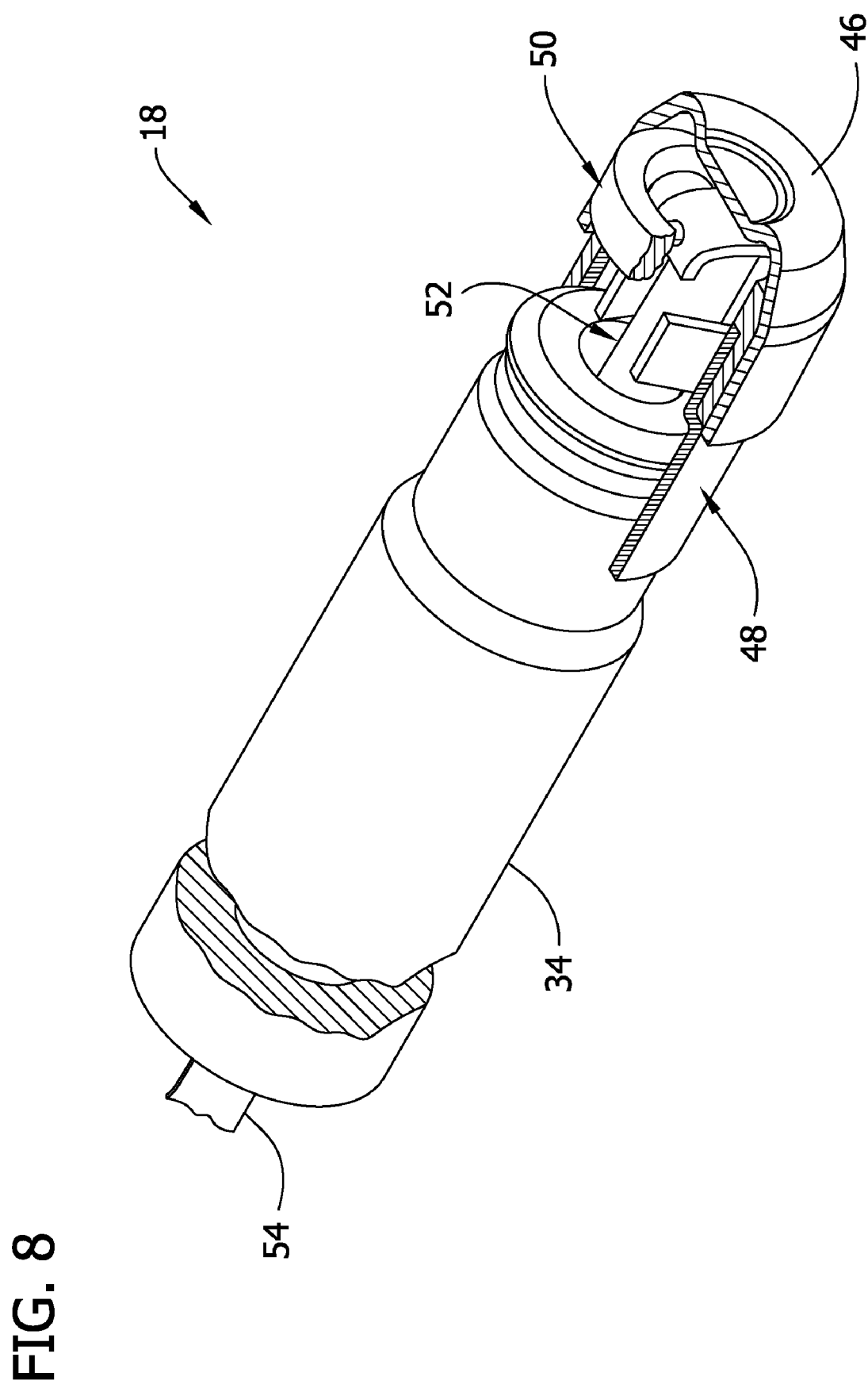
FIG. 8 is a fragmentary perspective of the probe with parts broken away to show internal construction.
Figure 9:
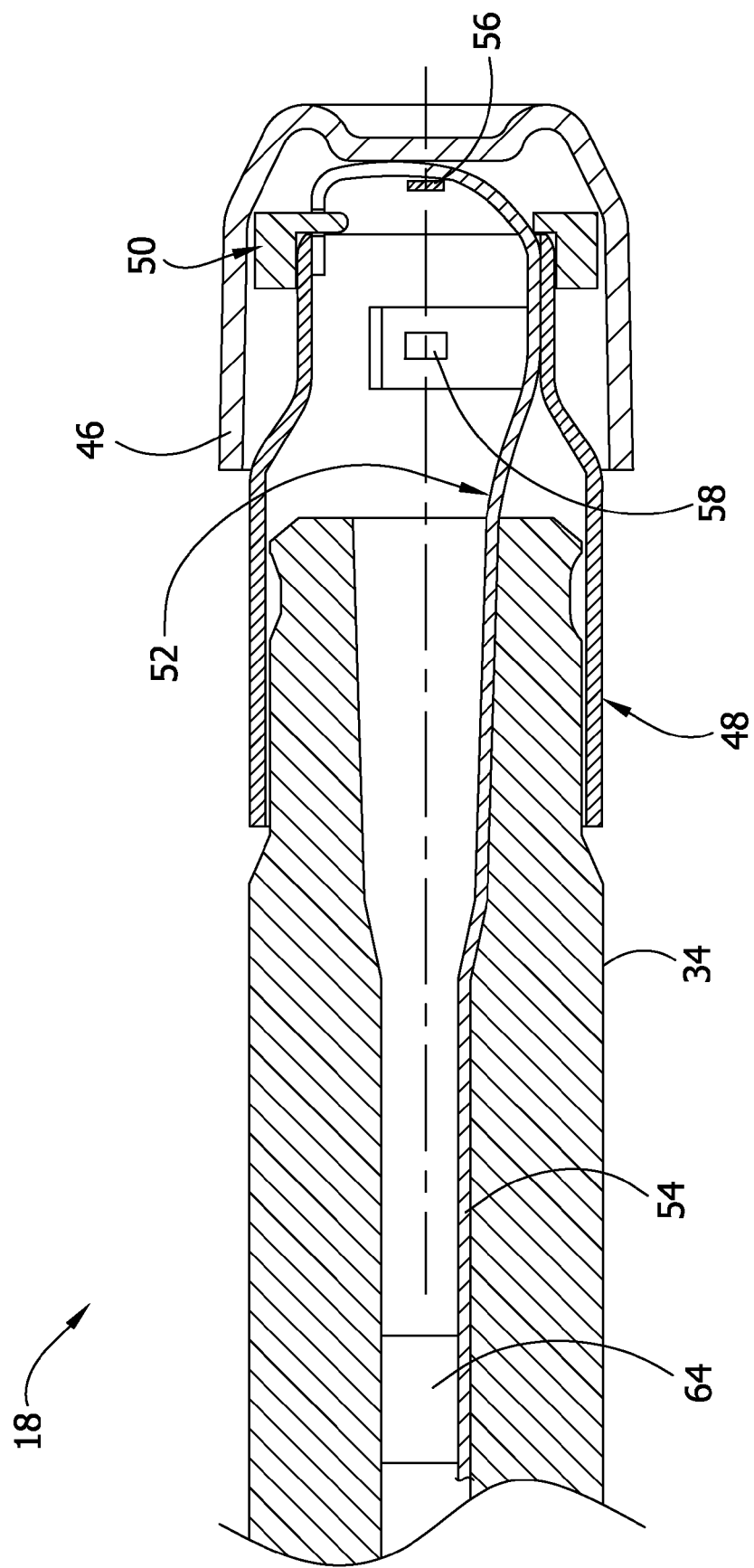
FIG. 9 is an enlarged, fragmentary section of the probe.

Referring to FIGS. 5 and 7-9, an aluminum tip 46 at a distal end of the probe shaft 34 is heated by the patient and the temperature of the tip is detected, as will be described more fully hereinafter. The probe cover is preferably made of highly thermally conductive material, at least at the portion covering the tip 46, so that the tip can be rapidly heated by the patient. Referring now to FIGS. 8 and 9, the tip 46 and distal end of the probe shaft 34 are partially broken away to reveal components used to measure the temperature of the tip. A generally tubular separator, generally indicated at 48, is mounted on the distal end of the probe shaft 34 and extends generally into an open bottom of the tip 46, but does not engage the tip. An isolator, indicated generally at 50, is mounted on the end of the separator 48 and engages the tip 46 for use in mounting the tip on the probe shaft 34. The probe shaft, the tip 46, the separator 48 and the isolator 50 may be connected together in a suitable fashion. A flex circuit, generally indicated at 52, includes a deformable substrate 54 mounting a tip thermistor 56 (broadly, a temperature sensing component; FIG. 9), a separator thermistor 58 (FIG. 9) and a heating resistor (not shown). The tip thermistor 56 is in thermal contact with the tip 46, and the separator thermistor 58 and heating resistor are in thermal contact with the separator 48. It will be appreciated that other electrical components (not shown) and other arrangements and numbers of components may be used without departing from the scope of the present invention.

The tip thermistor 56 generates a signal that is representative of the temperature of the tip 46. The signal is transmitted by one or more electrical conductors in the flex circuit substrate 54 to the circuitry in the housing 16. The separator thermistor 58 generates a signal that is representative of the temperature of the separator 48. The resistor heats the separator 48 so that the aluminum tip 46 can reach the temperature of the patient more rapidly. Monitoring the temperature of the separator 48 with the separator thermistor 58 allows the heating of the resistor to be controlled to best effect. For instance, the separator 48 can be initially rapidly heated, but then heated intermittently as the separator nears or reaches a preselected temperature. The function and operation of these components are known to those of ordinary skill in the art.

Referring to FIGS. 4 and 8-10, the thermometer 12 includes an automatic activating system for automatically configuring the thermometer between an active state (broadly, the thermometer is turned on) and a non-active state (broadly, the thermometer is turned off). As used herein, the term "active state" means that the thermometer 12 is operating so that it can take a temperature of a subject. Activation of the active state may include automatic powering up of the thermometer 12, including heating of the tip 46 of the probe 18 using the resistor, as is known in the art. The term "non-active state" means that the thermometer 12 cannot take a temperature of a subject, although other functions, such as data retrieval, may be performed. In general, the automatic activating system will automatically configure the thermometer 12 in a non-active state when the probe shaft 34 is received in the probe well 30 and will automatically configure the thermometer in an active state when the probe shaft is removed from the probe well. In this way, a power supply (e.g., batteries) is conserved because the user does not have to manually switch the thermometer 12 between the active sate and non-active state.

In general the activating system includes a solid-state activating sensor 62 (FIGS. 4, 10 and 11) in the housing 16 of the thermometer 12 and a magnet 64 (broadly, a magnetic source; FIGS. 8 and 9) in the probe 18 for activating the sensor when the probe is received in the probe well 30. As used herein, the term "solid-state" means that the sensor 62 does not have any moving parts. The activating magnet 64 may be, for example, either a permanent magnet, or a temporary magnet that can be temporarily magnetized, or an electromagnet. The activating sensor 62 is electrically connected to (broadly, "in communication with") the microcontroller 22. In the illustrated embodiment, the microcontroller 22 and the sensor 62 are mounted on the same printed circuit board 66. When the sensor 62 detects the magnetic field of the magnet (i.e., when the probe 18 is received in the probe well 30), the sensor sends a non-active output signal to the microcontroller 22. The microcontroller, in response, places the thermometer 12 in the non-active state. When the sensor 62 is no longer detecting the magnetic field of the activating magnet 64 (i.e., when the probe 18 is removed from the probe well 30), the sensor either discontinues the non-active output signal or sends a different, active signal to the microcontroller 22, and the microcontroller places the thermometer in the active state. Other arrangements of signaling are within the scope of the invention.

Figure 10:
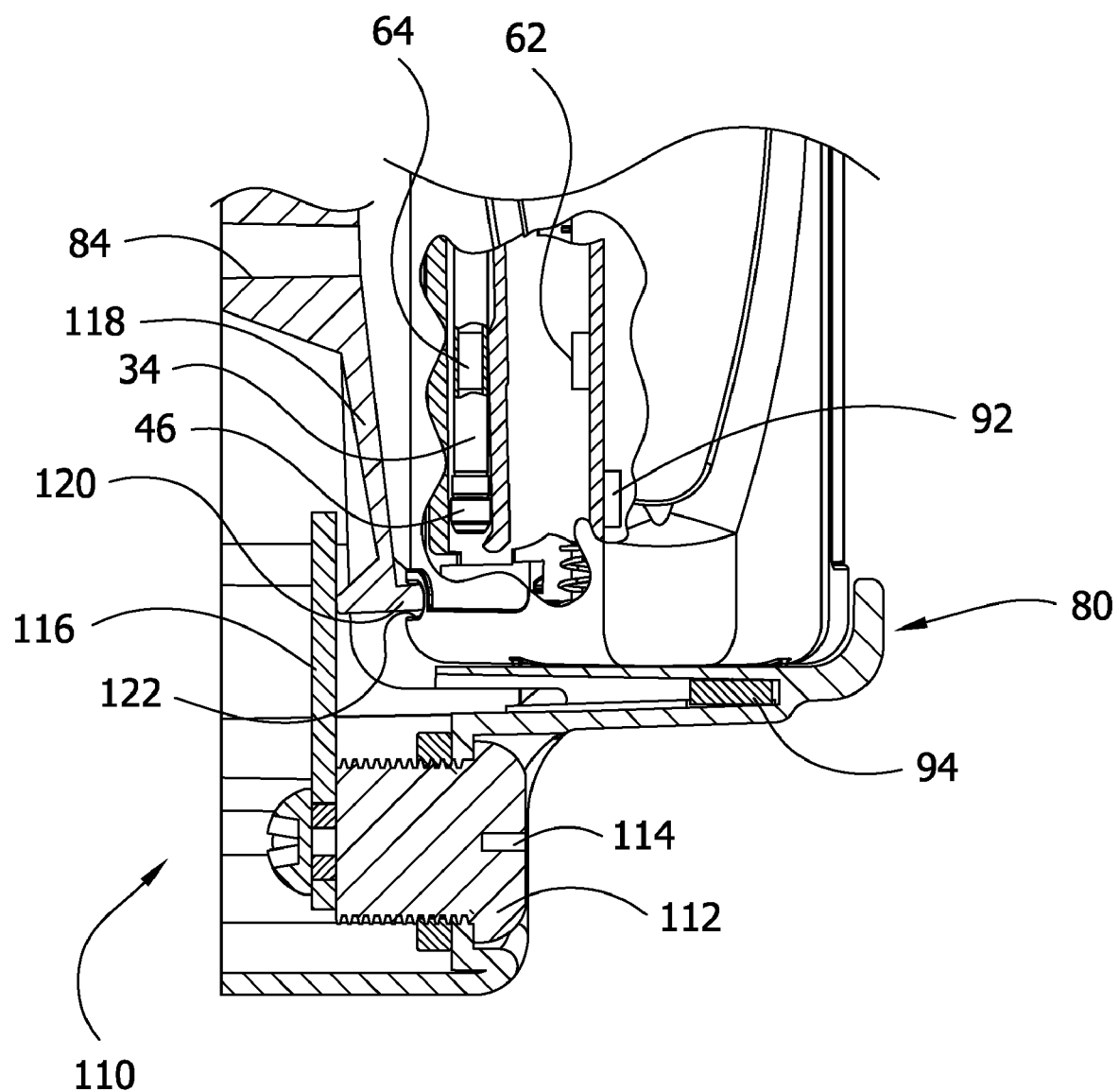
FIG. 10 is an enlarged, fragmentary side elevation of the thermometer received in the mount with the mount in section and parts broken away from the thermometer to show internal construction.

Referring to FIGS. 4, 9 and 10, the activating magnet 64 is mounted directly on the flex circuit 52 in the shaft of the probe 18 (FIGS. 9 and 10), and the sensor 62 is mounted on a back side of the circuit board 66 (FIGS. 4, and 10). The locations of the activating sensor 62 and the magnet 64 are such that when the probe 18 is substantially completely received in the probe well 30 (FIG. 10), the magnetic field from the magnet 64 is generally perpendicular to the sensor 62 so that the magnetic field activates the sensor. It is understood that the locations of the activating magnet 64 and the activating sensor 62 may be other than described, although it is preferred that the locations allow for the sensor to be activated only when the probe is substantially completely received in the probe well. It is understood that the magnetic source may be other than the activating magnet 64. For example, the probe shaft or another component(s) of the probe (e.g., the tip or the separator) may itself be magnetic, emitting a magnetic field for activating the sensor 62. Other arrangements for providing a magnetic component of the probe and other arrangement for providing a magnetic source to activate the sensor 62 are within the scope of the invention. Further still, other types of switches, besides solid-state sensors, are within the scope of the invention. For example, the activating system may include a mechanical switch for automatically configuring the thermometer between the active state and the non-active state as the thermometer probe is removed from and inserted into the probe well. Other types of switches or sensors are within the scope of the invention.

In one example, the activating sensor 62 comprises a Hall-effect sensor. As is known in the art, a Hall-effect sensor generally senses or detects a magnetic field having a (first) magnetic flux density or magnitude that is greater than or equal to a pre-selected operate point (i.e., the flux density necessary to activate the sensor). Thus, the activating sensor 62 has a pre-selected operate point at or below the flux density of the magnetic field of the magnet 64 at the sensor when the probe 18 is received in the probe well 30. Once the sensor 62 has been activated, it will stay active until it detects a magnetic field have a (second) flux density that is at or below a pre-selected release point of the sensor (i.e., the flux density necessary to deactivate the sensor). It will be appreciated that the second magnetic flux density could be zero or non-zero.

As will be appreciated by those of ordinary skill in the art, the Hall-effect sensor 62 may be a unipolar sensor, in that it senses only one of a north pole or a south pole of a magnet, or it may be an omnipolar sensor, in that it senses both a north pole and a south pole of a magnet. The sensor 62 may have a digital output or an analog output. In a preferred embodiment, the Hall-effect sensor is a low-power, omnipolar Hall-effect sensor having a digital output. Suitable Hall-effect sensors of this type include sensors sold by Allegro® Microsystems, Inc. as model numbers A3210, A3211, A3212, A3213 and A3214. Other Hall-effect sensors may be used within the scope of the invention. These sensors typically use less than about 20 μA of current. Moreover, alternatively the solid-state sensor 62 may be a magnetoresitive sensor, the structure and function of which is known to those of ordinary skill in the art. Other types of solid-state sensors are within the scope of the invention.

Figure 11:
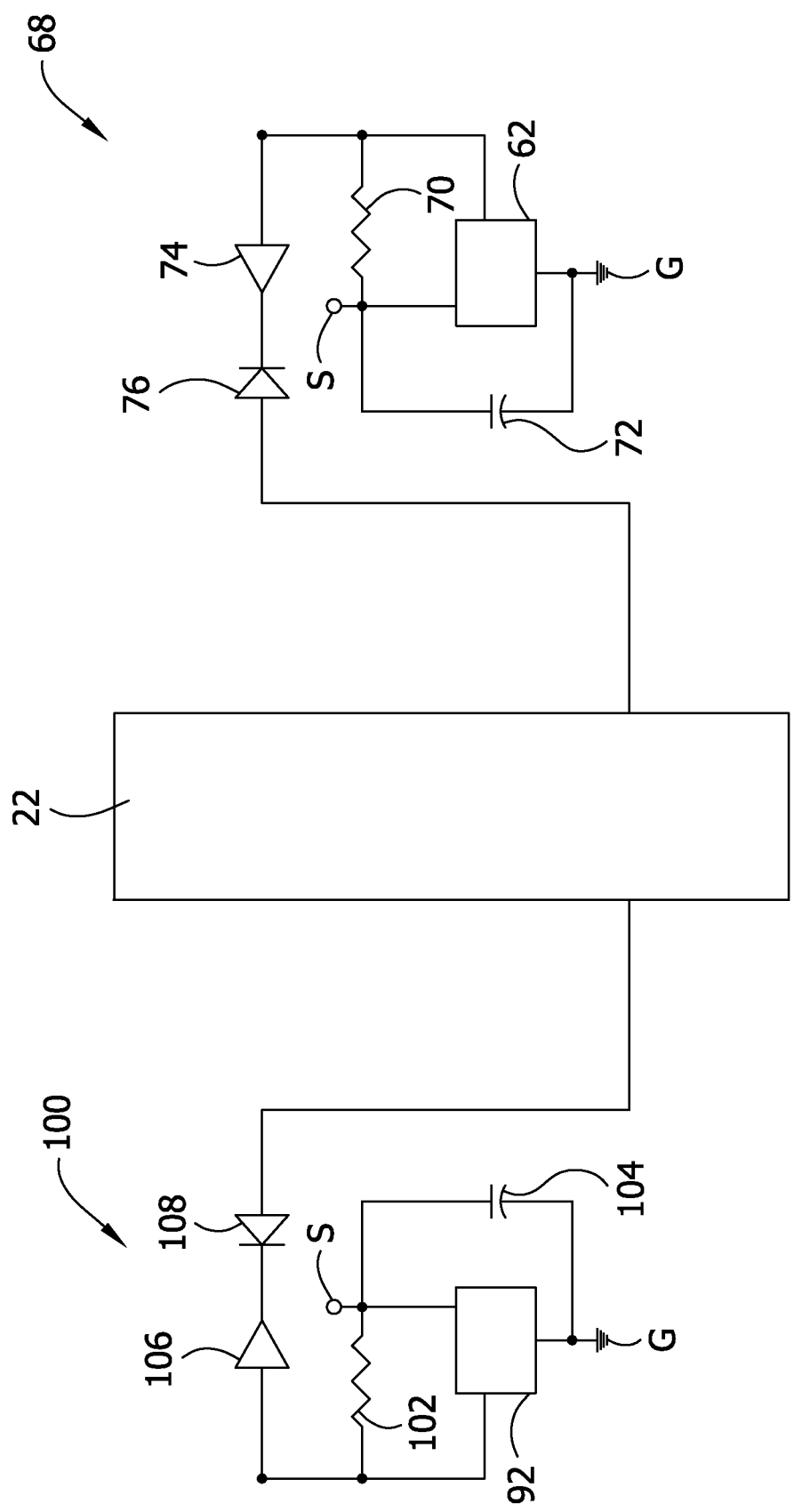
FIG. 11 is a schematic including circuitry of an activating system and an anti-theft system of the thermometer.

Referring to FIG. 11, a schematic of a suitable, non-limiting example of the circuitry of the automatic activating system is generally indicated at 68. The circuitry includes a Hall-effect sensor 62 (the activating sensor), sold by Allegro® Microsystems, Inc. under model number A3214ELHLT-T, interfaced with the microcontroller 22. The sensor 62 has an input voltage of 3 volts and uses less than about 5 μA of current. The circuitry also includes a pull-up resistor 70 having a resistance of 1.0 MΩ and a capacitor 72 between supply S and ground G having a capacitance of 0.1 μF for reducing noise. An inverter 74 (broadly, a logic gate) and a diode 76 (broadly, a leakage preventing device), the functions of which are explained below, are also a part of the circuit 68. The sensor 62 has an operate point of about 42 Gauss and a release point of about 32 Gauss. The magnet 64 mounted on the flex circuit 52 has a magnetic field having a magnetic flux density of between about 3800 Gauss and about 4200 Gauss, preferably about 3895 Gauss, sufficient to activate the sensor 62 when the probe 18 is received in the probe well 30. The specific values set forth herein may be other than stated without departing from the scope of the present invention.

When the probe 18 is received in the probe well 30, a first magnetic flux density is detected and the sensor 62 switches on and the output of the sensor switches low to about 100 mV. The inverter 74 (a NOT logic gate) receives the output signal from the sensor 62 and inverts the signal to 5 V (binary 1 state), which is sent to the microcontroller 22, signaling to the microcontroller to switch the thermometer 12 to the non-active state. When the probe 18 is removed from the probe well 30, the magnetic flux density falls below the release point (i.e., to a second magnetic flux density), and the sensor 62 switches off and the output switches high to 3 V. The inverter 74 receives the signal and inverts it to a low voltage of between about 100 mV and 300 mV, typically 200 mV (binary state 0) signaling to the microcontroller 22 to switch the thermometer 12 to the active state.

The diode 76 prevents current from flowing from the inverter 74 to the microcontroller 22 when the thermometer 12 is in the non-active state. Accordingly, the diode 76 reduces overall power consumption of the circuit 68. In the illustrated embodiment, the current leakage that is blocked by the diode 76 is about 25 μA. It is believed that the diode 76 may save approximately 18 mAh of battery capacity per month It is understood that the circuitry of the activating system may be other than described without departing from the scope of the invention.

Figure 11A:
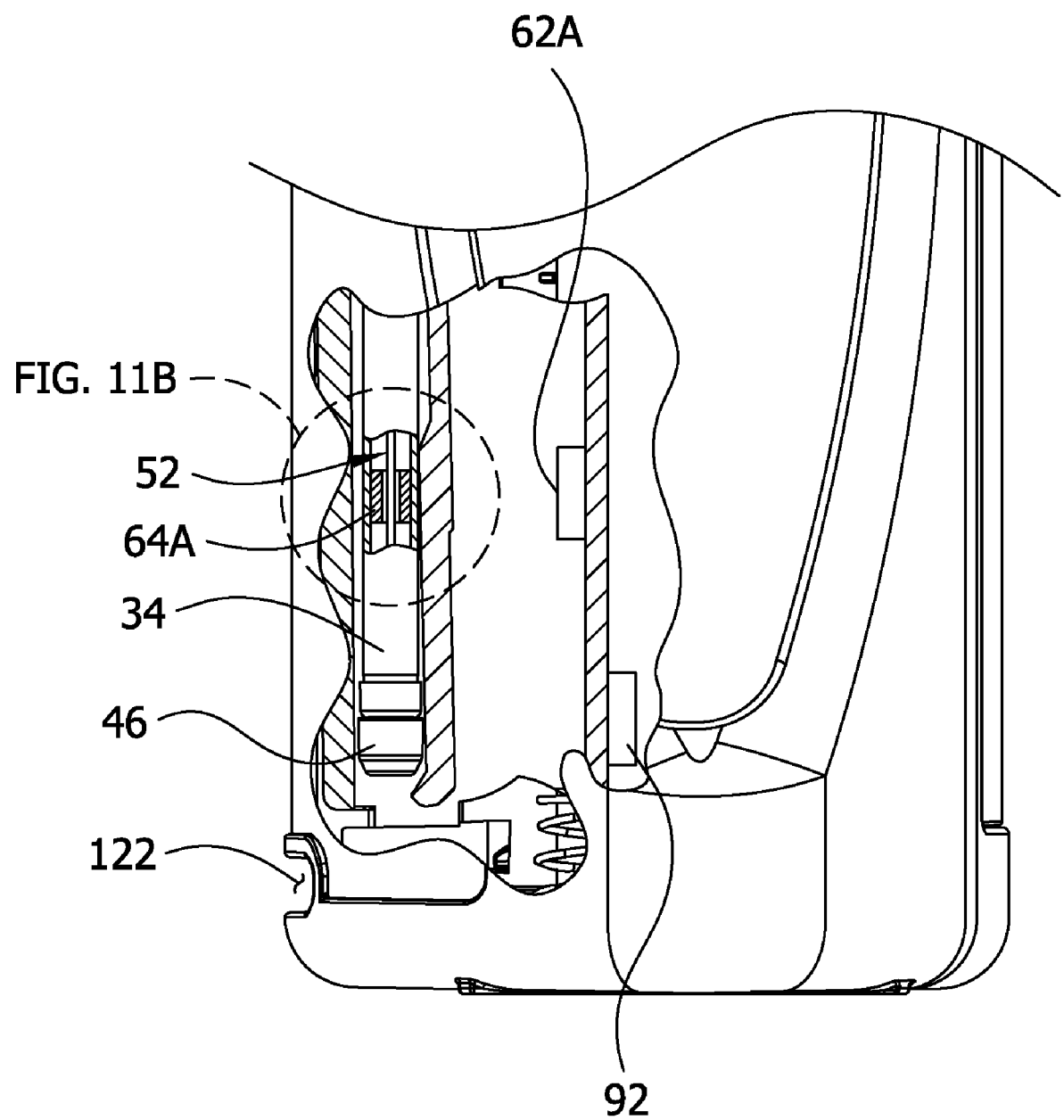
FIG. 11A is an enlarged, fragmentary side elevation of another embodiment of a thermometer with parts broken away to show internal construction.
Figure 11B:
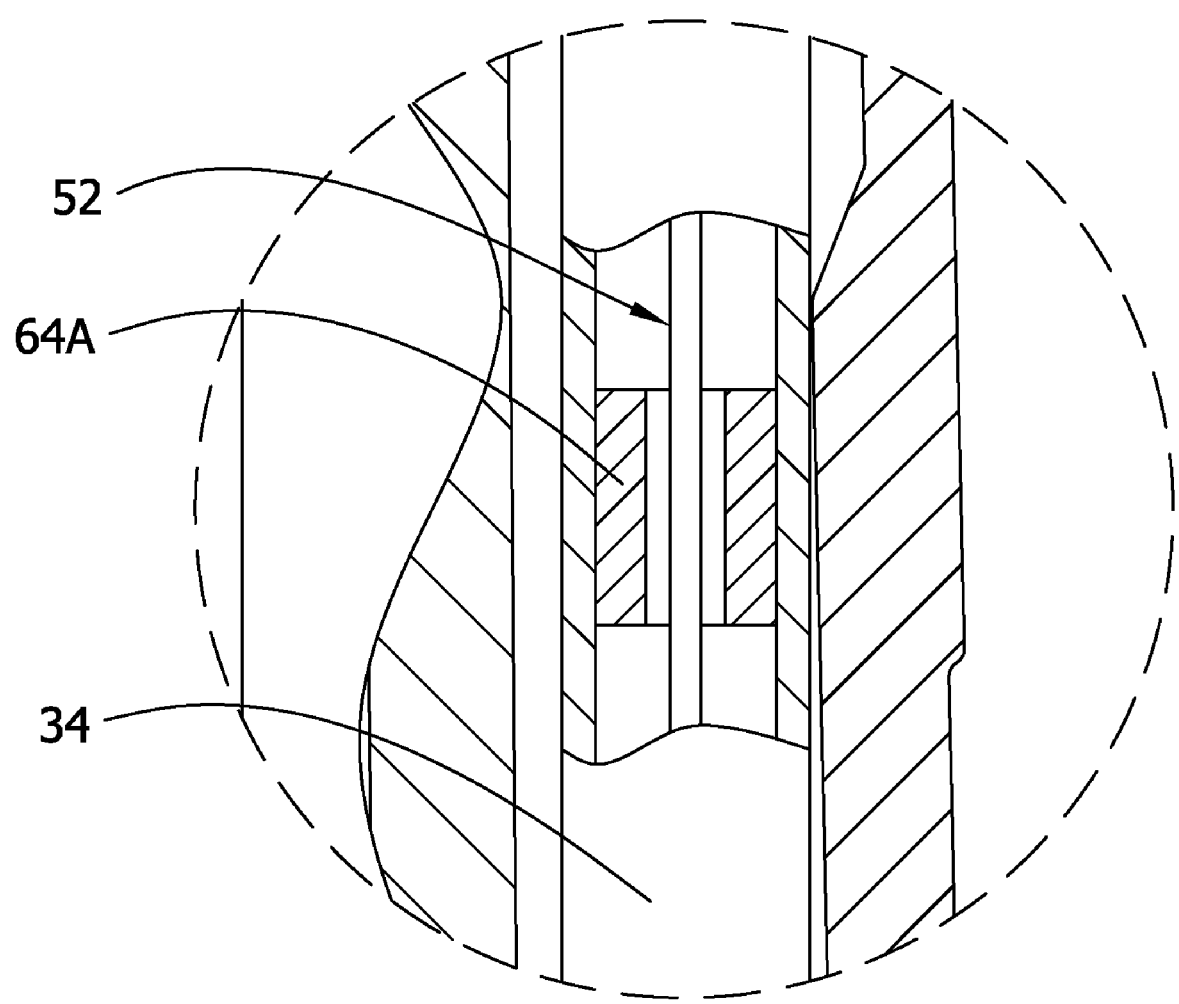
FIG. 11B is an enlarged fragmentary view of the internal construction of a probe as defined by FIG. 11A.

Referring to FIGS. 11A and 11B, in another embodiment the activating system is similar to the activating system described above, and therefore corresponding components are indicated by corresponding reference numerals. The present embodiment is different from the above-described embodiment in that the present activating system includes an activating sensor 62A comprising a Hall-effect sensor of the type that has a magnet (not shown) or other magnetic source associated with it. The magnet has a magnetic field with a flux density at the sensor greater than or equal to an operate point of the sensor so that the sensor is biased in an active state. A ferromagnetic or highly magnetically permeable ring_64A (broadly, a magnetically permeable structure) is disposed inside the probe shaft 34. The ring 64A is concentric with the probe shaft 34 and the flex circuit 52 extends through the central opening of the ring. When the probe 18 is seated in the probe well 30, the presence of the ferromagnetic ring 64A decreases the flux density of the magnetic source at the sensor 62A to less than or equal to the release point of the sensor, whereby the sensor is switched to its inactive state. The magnetically permeable structure may be other than a ring and may be associated with the probe in other ways. For example, it is contemplated that the structure may be disposed on the outer surface of the probe 18. Moreover, it is contemplated that the shaft 34 itself may be at least partially constructed of a ferromagnetic material. An activating circuit including the Hall-effect sensor 62A and the microcontroller 22 are configured so that when the Hall-effect sensor is active (i.e., the probe is not seated in the probe well), the thermometer 12 is in its active state and when the Hall-effect sensor is inactive (i.e., the probe is seated in the probe well), the thermometer is in its non-active state.

Figure 12:
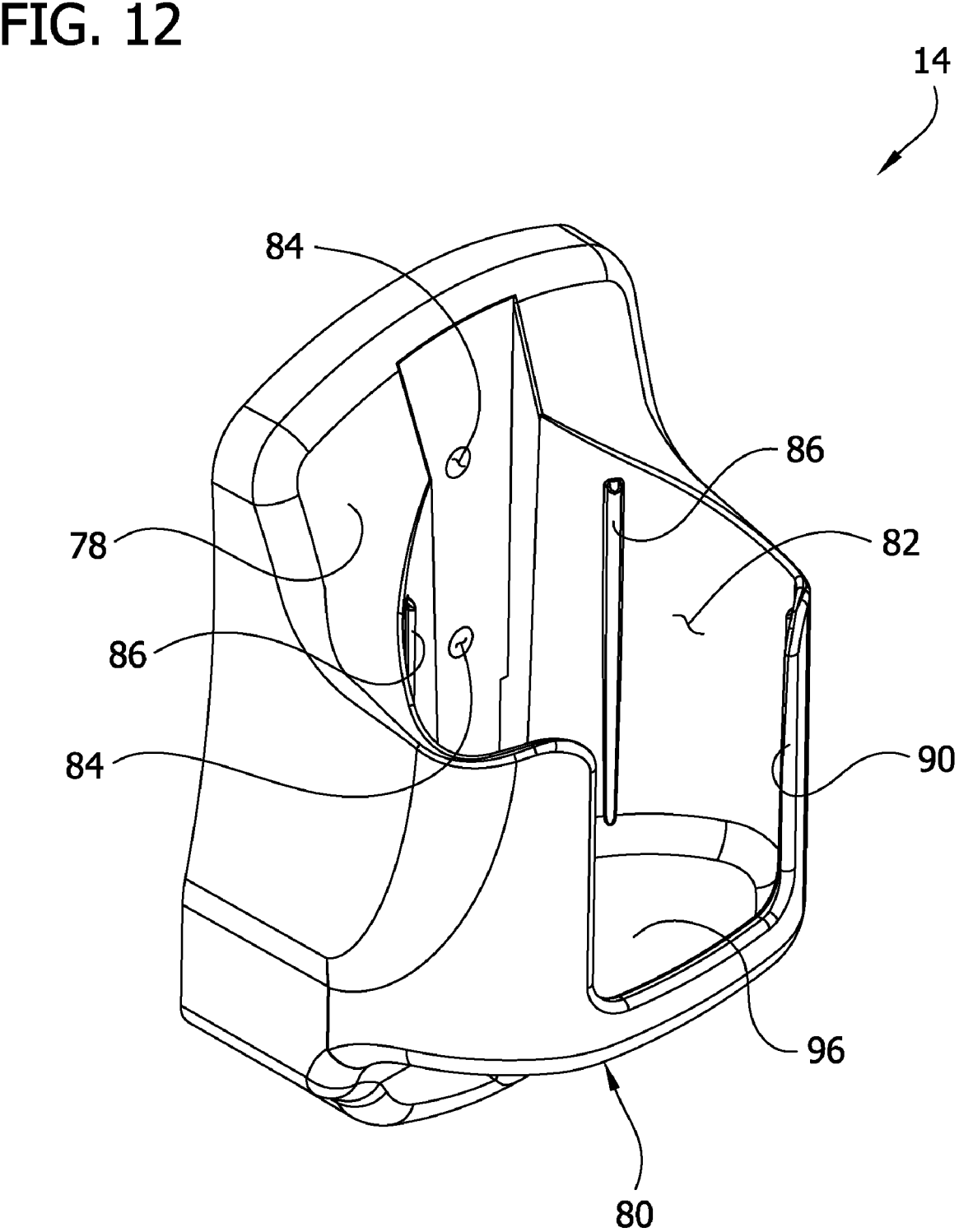
FIG. 12 is a perspective of the mount.
Figure 13:
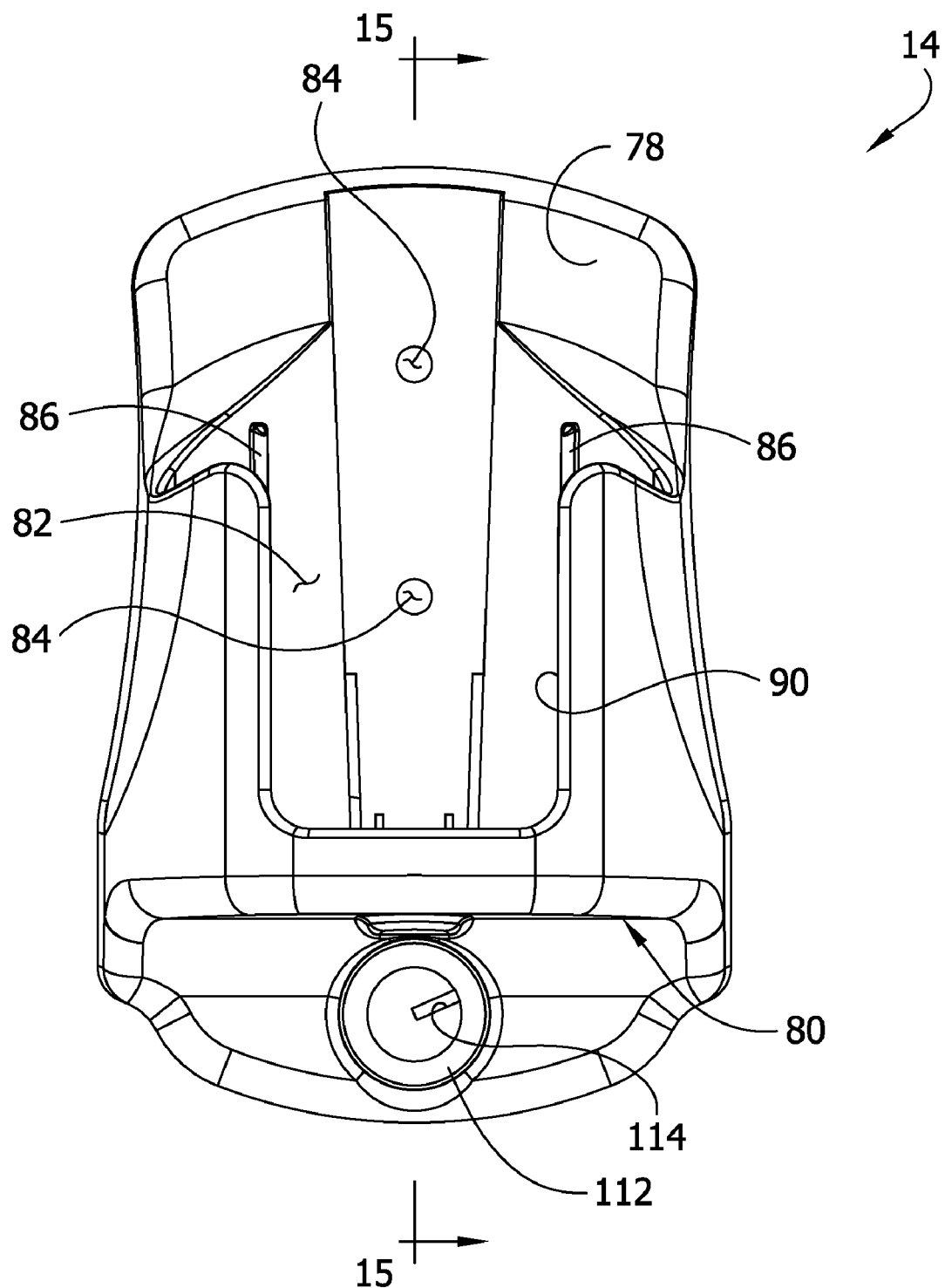
FIG. 13 is a front elevation of the mount.

Referring now to FIGS. 12 and 13, the mount 14 of the thermometry assembly 12 includes a rear wall 78 and a holder, generally indicated at 80, projecting forward from the rear wall and defining a cavity 80 for slidably receiving the housing 16 of the thermometer 12 to hold the thermometer in the mount. The mount 14 may be secured to a wall or other structure by inserting fasteners, e.g., screws, (not shown)

through spaced apart openings 84 in the rear wall 78 of the mount 14 and into the wall or other support structure. The holder 80 includes elongate vertical tongues 86 projecting into the cavity 82. The thermometer 12 slides between the tongues 86 when it is being received in the holder 80 so that the thermometer fits snugly therein. A front of the holder has a large opening 90 formed therein having a size and shape corresponding generally to the size and shape of the LCD screen 24 of the thermometer 12. The opening 90 allows the user to have access to the LCD screen 24 when the thermometer 12 is received in the mount 14.

The thermometry assembly 20 includes an anti-theft system for deterring theft of the thermometer 12. The microcontroller 22 includes an anti-theft counter that counts the number of uses of the thermometer 12 (broadly, a use-parameter) during a period beginning from the time the thermometer was last on the mount 14. That is, the counter records the number of uses from the time the thermometer 12 is removed from the mount 14 until the thermometer is returned to the mount. It is contemplated that the counter may record other use-parameters, including, but not limited to, real time elapsed. The microcontroller 22 is programmed to disable further operation of the thermometer 12 when a threshold number has been reached or exceeded by the counter. The counter is reset when the thermometer 12 is returned to the mount 14. Thus, as an example, if the threshold number is thirty, then the user is allowed to use (i.e., take a temperature) thirty times without having to return the thermometer 12 to the mount 15 before the microcontroller 22 will disable the operation of the thermometer. After being disabled the user must return the thermometer 12 to the mount 14 to use it again. If the user returns the thermometer 12 to the mount 14 before the counter reaches 15, then the counter is reset and the thermometer is not disabled.

Figure 14:
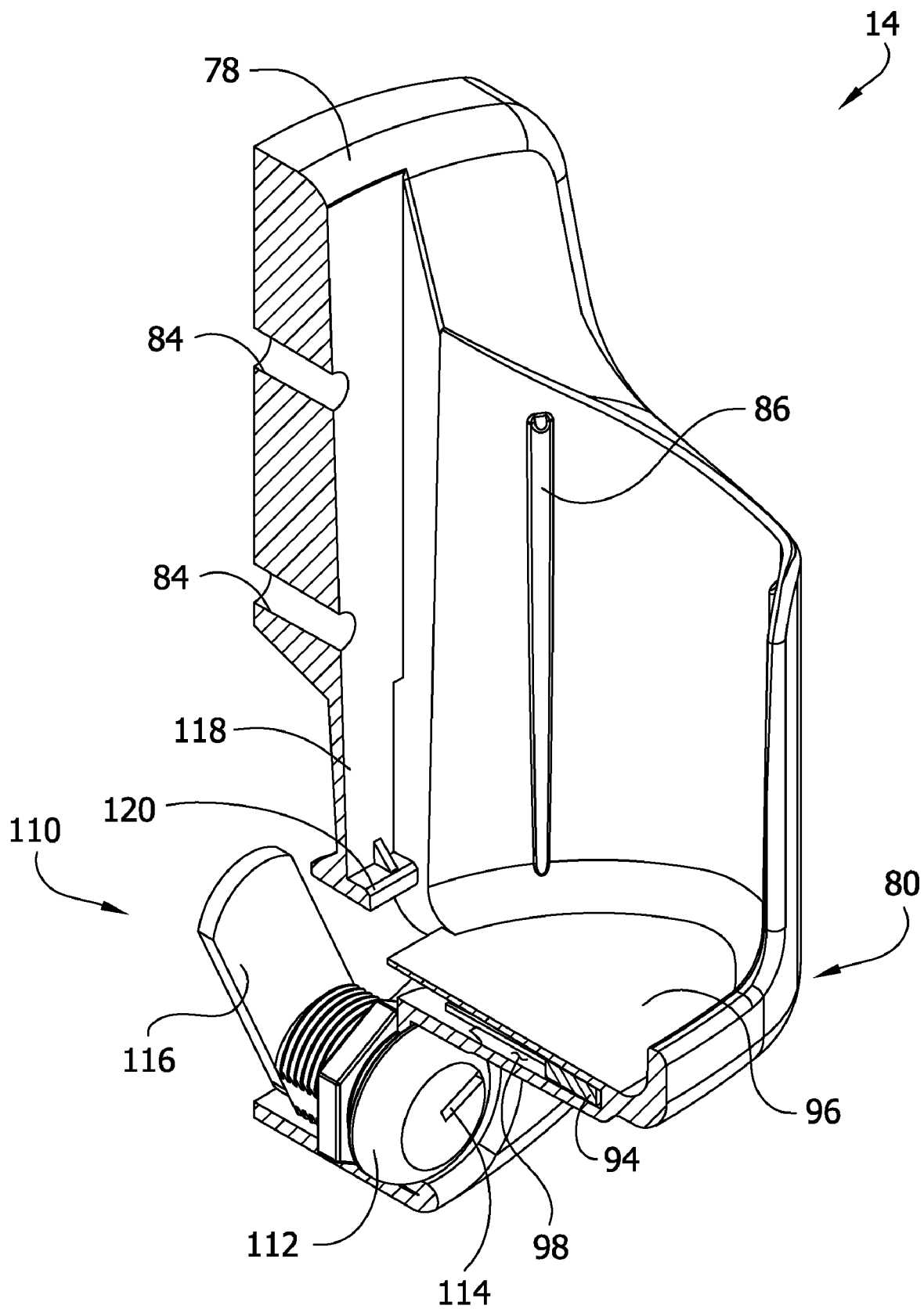
FIG. 14 is a vertical section of the mount.
Figure 15:
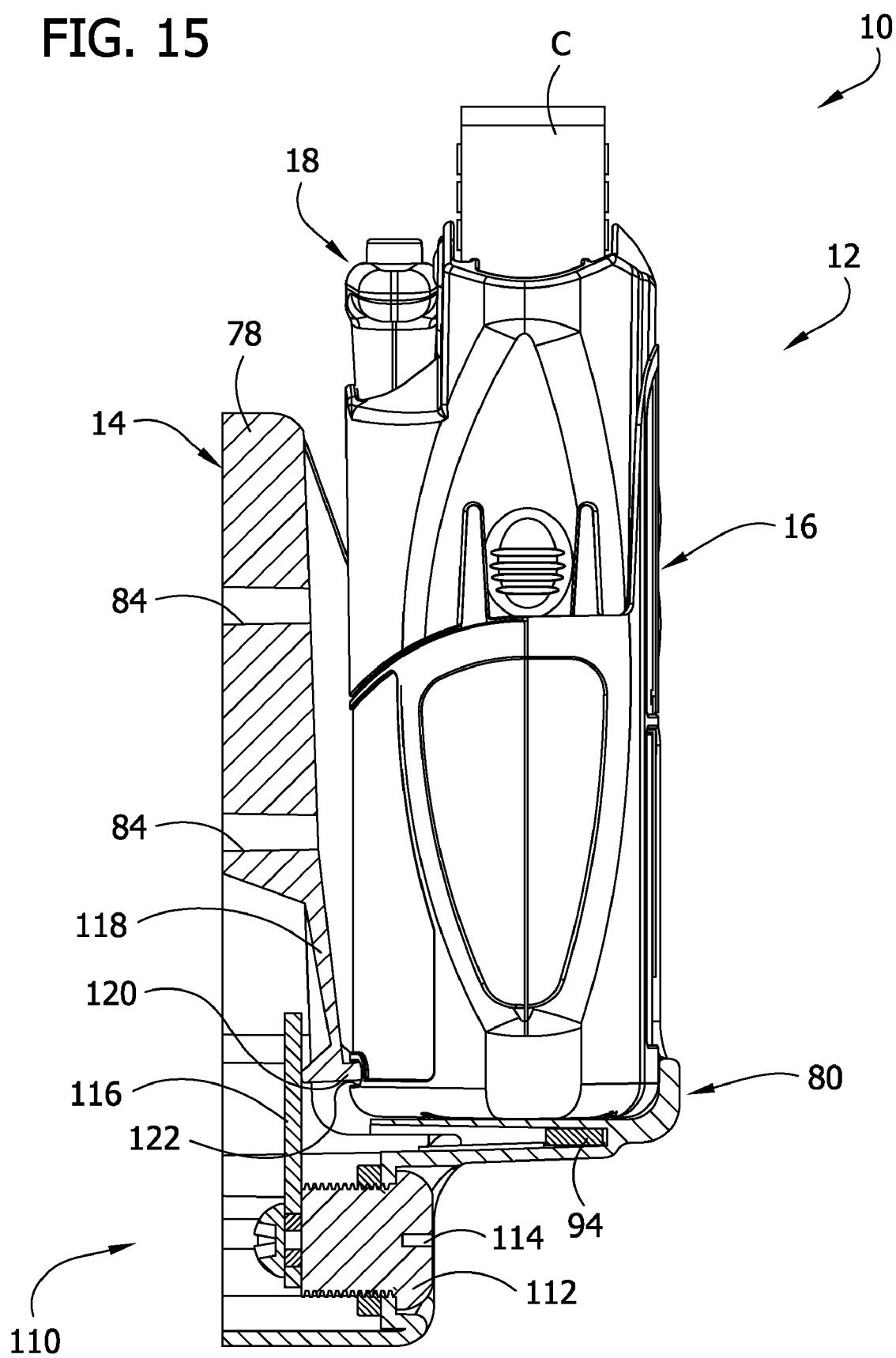
FIG. 15 is a section of the wall mount taken in a plane containing the line 15-15 of FIG. 13, with a thermometer received in the mount and not sectioned.

Referring to FIGS. 4, 10, 14 and 15, to determine when the thermometer 12 has been returned to the mount 14 and to reset the counter, the thermometer includes a solid-state anti-theft sensor 92 (FIGS. 4 and 10), and the mount includes a permanent magnet 94 (broadly an anti-theft magnetic source; FIGS. 14 and 15) emitting a magnetic field with a flux density sufficient to activate the sensor when the thermometer is received in the mount. The anti-theft sensor 92 may be of any of the types of sensors described above with respect to the activating sensor 62, or may be another type of solid-state sensor. Like the activating sensor 62, the anti-theft sensor 92 is preferably a low-power, omnipolar Hall-effect sensor, such as those sensors sold by Allegro® Microsystems, Inc. under the model numbers A3210, A3211, A3212, A3213 and A3214. Thus, the anti-theft sensor 92 may have a digital output when it is activated by the anti-theft magnet 94 and no output when it is not activated. The digital output is sent to the microcontroller 22, and the microcontroller resets the counter. Other configurations of the sensor 92 and the microcontroller 22, including other or additional circuitry are within the scope of the invention.

The anti-theft sensor 92 is mounted on the circuit board (FIGS. 4 and 10) so that it is in communication with the microcontroller 22. The magnet 94 is secured within a floor 96 (broadly, a structure) of the mount 14, such as by securing the magnet within a cavity 98 defined by the floor or injection molding the mount around the magnet. An operate point of the anti-theft sensor 92 (i.e., the magnetic flux density necessary to activate the sensor) and the magnetic flux density of the anti-theft magnet 94 are chosen so that when the thermometer 12 is substantially fully received in the mount 14, the magnet activates the sensor. It is understood that the locations of the anti-theft magnet 94 and the anti-theft sensor 92 may be other than described, although it is preferred that the locations allow for the sensor to be activated only when the thermometer 12 is substantially completely received in the mount 14.

Referring back to FIG. 11, a schematic of a non-limiting example of circuitry of the anti-theft system is generally indicated at 100. The circuitry 100 of the anti-theft system is substantially similar to the circuitry 68 of the activating system. The circuitry includes a Hall-effect sensor 92 (the anti-theft sensor), sold by Allegro® Microsystems, Inc. under the name A3214ELHLT-T. The sensor 92 is interfaced with the microcontroller 22. The sensor 92 has an input voltage of 3 volts and uses less than about 5 µA of current. The circuitry 100 also includes a pull-up resistor 102 having a resistance of 1.0 MΩ and a capacitor 104 between supply S and ground G having a capacitance of 0.1 µF for reducing noise. An inverter 106 (broadly, a logic gate) and a diode 108 (broadly, a leakage preventing device), the functions of which are explained below, are also a part of the circuit 100. The sensor 92 has an operate point of about 42 Gauss and a release point of about 32 Gauss. The anti-theft magnet 94 mounted in the floor 96 of the mount 14 emits a magnetic field having a magnetic flux density of about 2200 Gauss, sufficient to activate the sensor 92 when the thermometer 12 is received in the mount.

When the thermometer 12 is received in the mount 14, the sensor 92 switches on and the output of the sensor switches low to about 100 mV. The inverter 106 receives the output signal from the sensor 92 and inverts the signal to 5 V (binary 1 state), which is sent to the microcontroller 22, signaling to the microcontroller to reset the counter. When the thermometer 12 is removed from the mount 14, the magnetic flux density falls below the release point of the sensor 92, and the sensor switches off and the output switches high to 3 V. The inverter 106 receives the output signal and inverts it to a low voltage of between about 100 mV and 300 mV, typically 200 mV (binary state 0) signaling to the microcontroller 22 to reset the counter. The diode 108, like the diode 76 of the activating circuitry 68, prevents current from flowing from the inverter 106 to the microcontroller 22 when the thermometer 12 is removed from the mount 14. Accordingly, the diode 108 reduces overall power consumption of the circuit 100. In the illustrated embodiment, the current leakage that is blocked by the diode 108 is about 25 µA. Thus, it is believed that together the two diodes 108, 76 save approximately 432 mAh of battery capacity per year. It is understood that the circuitry 100 of the anti-theft system may be other than described without departing from the scope of the invention.

Referring to FIG. 10, as will be understood by those skilled in the art, the respective locations of the activating sensor 62, the anti-theft sensor 92, the activating magnet 64 and the anti-theft magnet 94 are such that the activating magnet does not activate the anti-theft sensor when the probe is seated in the probe well 30 and the anti-theft magnet does not activate the activating sensor when the thermometer 12 is received in the mount 14. The respective locations may be a function of the flux densities of the magnets 64, 94 and the locations of the sensors relative to the corresponding magnet. As an example, in the illustrated embodiment, a ratio of the distance between the activating magnet 64 and the anti-theft sensor 92 and the distance between the activating magnet and the activating sensor 62 must be greater than about 1.77. In other words, the distance between the activating magnet 64 and the anti-theft sensor 92 must be at least 1.77 times greater than the distance between the activating magnet and the activating sensor 62 so that the activating magnet, having a flux density of 3895 Gauss, will activate the activating sensor when the probe 18 is seated in the probe well 30 but will not activate the anti-theft sensor. Likewise, a ratio of the distance between the anti-theft magnet 94, having a flux density of 2200 Gauss, and the activating sensor 62 and the distance between the anti-theft magnet and anti-theft sensor 92 must be greater than about 1.77 to prevent the anti-theft magnet from activating the activating sensor 62. Other ways of preventing interference between the magnets 64, 94 and the sensors 62, 92 are within the scope of the invention. For example, the sensors 62, 92 may have different operate points, and the magnets 64, 94 may have different flux densities.

In another embodiment (not shown), the Hall-effect sensor of the anti-theft system may be of the type that has a magnet or other magnetic source associated with it. The magnet has a magnetic field with a flux density at the sensor greater than or equal to an operate point of the sensor so that the sensor is biased in an active state. In such an embodiment, a ferromagnetic or highly magnetically permeable structure may be associated with the mount whereby when the thermometer is received in the mount, the presence of the ferromagnetic structure decreases the flux density of the magnetic source at the sensor to less than or equal to the release point of the sensor, whereby the sensor is switched to its inactive state. As an example, the bottom of the holder of the mount may be constructed of a ferromagnetic material. An anti-theft circuit, including the Hall-effect sensor, and the microcontroller are configured so that when the Hall-effect sensor is active (i.e., the thermometer is not received in the mount) the anti-theft counter is not reset and when the Hall-effect sensor is inactive (i.e., the thermometer is received in the mount), the anti-theft counter is reset.

Referring to FIGS. 10 and 13-15, in addition to the anti-theft system, the mount 14 includes a keyed latch mechanism, generally indicated at 110 (FIGS. 14 and 15), for locking the thermometer 12 in the mount to deter theft. The keyed latch mechanism 110 includes a keyed bolt 112. The bolt is located below the holder 80 in the rear wall 78 of the mount 14 so that an opening of a keyslot 114 of the bolt is forward of or substantially flush with a front face of the rear wall. The bolt 112 extends through the rear wall 78 and includes a rotatable cam 116 that is located on a rear side of the rear wall. The cam 116 is rotatable between a substantially vertical position (locking position), as shown in FIG. 15, and a substantially horizontal position (unlocking position), generally as shown in FIG. 14. A cantilever latch 118 engageable by the cam 116 when the cam is in its vertical position is hingedly attached (i.e., by a living hinge) to the rear wall 78. The latch 118 is movable between an initial, unlocked position, in which the cam 116 is not contacting the latch (FIG. 14), and a forward, locked position, in which the cam contacts the latch and moves the latch forward (FIG. 15). It is contemplated that a keyed tumbler (e.g., a 5 pin radial tumbler) or other suitable lock may be used in place of the bolt 112.

In use, when the thermometer 12 is received in the mount 14, the user inserts a key (not shown) into the bolt 112, and turns the key to the right, thereby rotating the cam 116 into its vertical position. As the cam 116 rotates, it engages the latch 118 and deflects the latch from it initial position forward to its locked position. When the latch 118 is in its locked position, an engagement member 120 of the latch is received in a recess 122 formed in the back side of the housing 16 (FIG. 15). The cam 116 retains the engagement member 120 of the latch 118 in the recess 122 until the keyed bolt 112 is turned to the left and the cam disengages the latch. Other ways of locking the thermometer 12 in the mount 14 is within the scope of the invention.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of making an electronic thermometry assembly including a thermometer and a mount for receiving the thermometer, the method comprising:
    assembling a magnetic source capable of generating a magnetic field into a housing of the mount,
    mounting on a circuit board a microcontroller including a resettable anti-theft counter for recording a use-parameter of the thermometer, wherein the thermometer is disabled in an anti-theft mode when the counter reaches a pre-selected number,
    mounting on the circuit board a solid-state sensor in communication with the microcontroller, the sensor being capable of being activated by the magnetic field of the magnetic source to signal to the microcontroller to reset the anti-theft counter and enable the thermometer to take temperature data,
    assembling the circuit board with the microcontroller and solid-state sensor thereon into a housing of the thermometer.

2. A method of making an electronic thermometer as set forth in claim 1 further comprising mounting a leakage preventing device on the circuit board for preventing current from flowing between the solid-state sensor and the microcontroller when the thermometer is not received in the mount.

3. A method of making an electronic thermometer as set forth in claim 2 wherein the leakage preventing device comprises a diode.

4. A method of making an electronic thermometer as set forth in claim 3 further comprising mounting a logic gate on the circuit board for receiving an input signal from the sensor and sending a reset signal to the microcontroller.

5. A method of making an electronic thermometer as set forth in claim 4 wherein the logic gate comprises an inverter.

6. A method of making an electronic thermometer as set forth in claim 5 wherein mounting a leakage preventing device comprises electrically interposing the diode between the inverter and the microcontroller.

7. A method of making an electronic thermometry assembly as set forth in claim 1 wherein assembling a magnetic source comprises disposing the magnet source in a wall of the mount.

8. A method of making an electronic thermometry assembly as set forth in claim 7 wherein the magnetic source is a magnet and wherein assembling a magnetic source further comprises injection molding the wall of the mount around the magnetic source so that the magnet is embedded in the wall of the mount.

9. A method of making an electronic thermometry assembly as set forth in claim 8 wherein said wall of the mount is a floor of the mount that contacts a bottom portion of the thermometer.

10. A method of making an electronic thermometry assembly as set forth in claim 7 wherein the magnetic source is a magnet and wherein assembling a magnetic source further comprises securing the magnet within a cavity formed in the wall of the mount.

11. A method of making an electronic thermometry assembly as set forth in claim 1 wherein the solid-state sensor constitutes a first sensor and the magnetic source constitutes a first magnetic source, the method further comprising:

assembling a temperature sensing component and a second magnetic source capable of generating a magnetic field into a probe of the thermometer;

operatively interconnecting the microcontroller and the temperature sensing component for communication of temperature information from the temperature sensing component to the microcontroller, the microcontroller being configured for placing the thermometer in an active state to acquire temperature information from the temperature sensing component and for placing the thermometer in an inactive state;

mounting on the circuit board a second solid-state sensor having no moving parts that is capable of detecting the presence of a magnetic field associated with the second magnetic source on the circuit board so that the second solid-state sensor and the microcontroller are in electrical communication with each other.

12. A method of making an electronic thermometry assembly as set forth in claim 11 wherein the first magnetic source comprises a first magnet and the second magnetic source comprises a second magnet.

13. A method of making an electronic thermometry assembly as set forth in claim 12 wherein respective locations of the first and second magnets and the first and second solid-state sensors are such that the first magnet does not activate the second solid-state sensor when it activates the first solid-state sensor and the second magnet does not activate the first solid-state sensor when it activates the second solid-state sensor.

14. A method of making an electronic thermometry assembly as set forth in claim 13 wherein a ratio of a distance between the second magnet and the first sensor and a distance between the second magnet and the second sensor is greater than or equal to about 1.77, and wherein a ratio of a distance between the first magnet and the second sensor and a distance between the first magnet and the first sensor is greater than or equal to about 1.77.

* * * * *